United States Patent
Poepperl et al.

(10) Patent No.: US 12,510,666 B2
(45) Date of Patent: Dec. 30, 2025

(54) METHOD FOR MONITORING A GROUND CLEARANCE

(71) Applicant: VALEO SCHALTER UND SENSOREN GMBH, Bietigheim-Bissingen (DE)

(72) Inventors: Maximilian Poepperl, Kronach Neuses (DE); Felix Becker, Kronach Neuses (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 146 days.

(21) Appl. No.: 18/684,181

(22) PCT Filed: Aug. 5, 2022

(86) PCT No.: PCT/EP2022/072105
§ 371 (c)(1),
(2) Date: Feb. 16, 2024

(87) PCT Pub. No.: WO2023/025569
PCT Pub. Date: Mar. 2, 2023

(65) Prior Publication Data
US 2024/0427015 A1  Dec. 26, 2024

(30) Foreign Application Priority Data
Aug. 24, 2021 (DE) .................... 10 2021 121 854.3

(51) Int. Cl.
*G01S 15/931* (2020.01)
*G01S 15/87* (2006.01)

(52) U.S. Cl.
CPC .......... *G01S 15/931* (2013.01); *G01S 15/878* (2013.01)

(58) Field of Classification Search
CPC ...... G01S 15/878; G01S 15/89; G01S 15/931; G01S 15/932; G01S 15/937
See application file for complete search history.

(56) References Cited

U.S. PATENT DOCUMENTS

| | | | | |
|---|---|---|---|---|
| 2016/0027303 A1* | 1/2016 | Zhao | ...................... | G08G 1/165 701/301 |
| 2018/0341265 A1* | 11/2018 | Myers | ................. | B60W 60/001 |

\* cited by examiner

*Primary Examiner* — Benyam Haile
(74) *Attorney, Agent, or Firm* — Osha Bergman Watanabe & Burton LLP (57) ABSTRACT

A method for monitoring a ground clearance beneath a motor vehicle is disclosed. On the underbody of the motor vehicle, a plurality of ultrasonic transceivers are arranged spaced apart from one another. The method includes sending a transmission signal from a first ultrasonic transceiver, receiving a reflected transmission signal with a second ultrasonic transceiver, repeating the sending and receiving steps, determining a profile of a ground beneath the vehicle based on the echo signals, and determining a minimum ground clearance by comparing the ground profile with the underbody profile of the motor vehicle. Different pairs consisting of a first and a second ultrasonic transceiver are selected to receive a respective echo signal.

15 Claims, 4 Drawing Sheets

METHOD FOR MONITORING A GROUND CLEARANCE

The invention relates to the use of ultrasonic measurement technology in motor vehicles and in particular to a method for monitoring ground clearance beneath a motor vehicle, to a computer program product, a device and a motor vehicle.

Motor vehicles are equipped with ultrasonic transceivers, which emit ultrasonic transmission signals into an environment of the motor vehicle and receive ultrasonic echo signals from the environment of the motor vehicle in order thereby to acquire information about the environment of a motor vehicle and transmit said information to a parking assistance system, a driving assistance system or the like.

DE 10 2018 221517 A1 describes a system in which the environment of a motor vehicle is monitored with ultrasonic transceivers located in the underbody of the motor vehicle.

DE 10 2018 130914 A1 describes a system that is designed to detect objects in the underbody region of a parked motor vehicle. This involves performing an ultrasonic measurement at two different times in the underbody region, and comparing the two measurements. The first measurement is made immediately after the vehicle has been parked and the second measurement is made at a time when it is intended to check whether an object is beneath the vehicle.

In particular in the case of off-road vehicles, there is a need for solutions to determine a ground clearance beneath a moving vehicle.

Against this background, the object of the present invention is to provide an improved method for determining a ground clearance beneath a motor vehicle.

According to a first aspect, a method is therefore proposed for monitoring a ground clearance beneath a motor vehicle, on the underbody of which are arranged a plurality of ultrasonic transceivers spaced apart from one another. The method comprises: a) selecting a first ultrasonic transceiver from among the plurality of ultrasonic transceivers and activating the first ultrasonic transceiver to send a transmission signal; b) selecting a second ultrasonic transceiver from among the plurality of ultrasonic transceivers and activating the second ultrasonic transceiver to receive a reception signal which is a reflection of the transmission signal sent in step (a); c) repeating steps a) and b), wherein different pairs consisting of a first and a second ultrasonic transceiver are selected to receive a respective echo signal; d) determining a profile of a ground beneath the motor vehicle on the basis of the received echo signals; and e) determining a minimum ground clearance beneath the motor vehicle by comparing the determined profile of the ground with an underbody profile of the motor vehicle.

The proposed method has the beneficial effect of using knowledge of the minimum ground clearance beneath the motor vehicle to avoid damage to the underbody of the motor vehicle.

The proposed method can be advantageously carried out in particular without calibration, i.e. without comparing two measurements at different times, and is therefore advantageously also suitable for use in moving motor vehicles.

With the proposed method, by permutation of the pairs consisting of a first, transmitting and a second, receiving ultrasonic transceiver a large number of measurement points can be obtained advantageously, and hence a large ground area beneath the underbody can be monitored, even with a small number of ultrasonic transceivers.

In particular, by means of the proposed permutation of the pairs, the number of obtainable measuring points advantageously scales quadratically, in particular by $N*(N-1)$, where N is the number of ultrasonic transceivers.

A ground clearance is intended to mean, in particular, a clear distance in the vertical direction, relative to the motor vehicle, between a point on a ground surface on which the motor vehicle is standing or driving (a point of the specified ground profile) and a point on the underbody of the motor vehicle.

A transmission signal and a reception signal are each intended to mean, in particular, an ultrasonic signal which can be described by an ultrasonic vibration with one or more fundamental frequencies and an envelope curve. The transmission signal and the reception signal can preferably be a time-limited ultrasonic pulse in each case.

In particular, the activation for receiving the reception signal in step b) is carried out simultaneously with or subsequent to the activation for emitting the transmission signal in step a).

The first and second ultrasonic transceivers can be selected arbitrarily from among the ultrasonic transceivers, however, in each individual iteration of step a) the first ultrasonic transceiver is different to the second ultrasonic transceiver.

Each activation can be carried out, for example, by transmitting signals to and receiving signals from an application-specific control circuit (ASIC) mounted on a printed circuit board of the ultrasonic transceiver, which controls the sending and receiving of ultrasonic signals by the ultrasonic transceiver.

An echo signal which corresponds to a reflection of the transmission signal transmitted in step a) should preferably be understood to mean, for example: an echo signal having a frequency that matches the frequency of the transmission signal; an echo signal having an amplitude, in particular an amplitude of the envelope, which exceeds a predetermined threshold value, which is selected taking into account an amplitude of the transmission signal; an echo signal having a waveform or envelope that matches the waveform of the transmission signal, and the like. "Match" in this case should be understood to mean an identity relationship or a similarity relationship. A similarity relationship preferably takes into account physical conditions, such as changes in the signal waveform, the amplitude and the like of the transmission signal on its path from the first to the second ultrasonic transceiver.

In particular, a given ultrasonic transceiver can be configured to emit a transmission signal in a direction diagonally downwards in the direction of the ground beneath the motor vehicle and to receive an echo signal from one or more directions diagonally from below coming from the ground beneath the motor vehicle.

The plurality of ultrasonic transceivers spaced apart from one another are arranged in particular in such a way that they are facing each other. "Facing each other" here means in particular that, in particular under the assumption of a flat ground beneath the motor vehicle, a transmission signal cone emitted by an ultrasonic transceiver is emitted in the direction of the ground and reflected at that ground in such a manner that the reflected signal cone reaches at least one, preferably a plurality, particularly preferably all of the other ultrasonic transceivers arranged spaced apart from one another on the underbody. In particular, a signal cone should be understood to mean a signal that is emitted with a specific opening angle.

Executing steps a) and b) once can be understood as carrying out a measurement in which a reception signal is measured. The result of the measurement (a measurement point) can be, for example, a time-of-flight difference between emitting the transmission signal and receiving the reception signal.

"Repetition" should be understood to mean in particular the multiple execution of steps a) and b) simultaneously and/or in chronological sequence.

For the interpretation of the feature "different pairs" in step c), a first pair of two ultrasonic transceivers and a second pair of ultrasonic transceivers are deemed to be different if one of the pairs contains at least one ultrasonic transceiver that is not included in the other pair. In contrast, in the interpretation of the "different pairs" feature in step c), two pairs in which only the first and the second ultrasonic transceivers are interchanged are not deemed to be different. Nevertheless, it is conceivable for two measurements made with two such pairs not considered "different" to be performed with merely interchanged ultrasonic transceivers, in order to further increase the number of measurements. However, in step c) after all repetitions have been completed, at least a plurality of echo signals have been received from a plurality of pairs deemed to be different.

"Determine" in the present application should be understood in particular to mean computational determination by means of a computerized device.

The "profile of a ground" can be understood, for example, as a set of points that have been determined as points on the ground and form a profile line or a profile surface. For example, the profile may be a set of data in which each coordinate specifying a position on a horizontal line or plane under the motor vehicle is assigned ground height information. The "profile of a ground" may also be a vector representation or any other suitable computer-processable representation of a profile line (line or two-dimensional representation of a profile) or a profile surface (not necessarily flat surface or three-dimensional representation of a profile). A profile can thus be, for example in a two-dimensional case, a data-based representation of a line, which indicates a course of a ground height along a longitudinal direction (direction of travel) beneath the motor vehicle, and in a three-dimensional case, a data-based representation of a surface indicating a course of the ground height above an imaginary horizontal surface beneath the underbody of the motor vehicle.

The determination of the ground profile based on the received echo signals can be carried out, in particular, on the basis of the times of flight of the received echo signals and on the basis of the installation locations of the respective ultrasonic transceivers, with which the respective echo signal was received and the associated transmission signal was sent.

For example, the "underbody profile of the motor vehicle" can be a set of points on the underbody of the motor vehicle. The "underbody profile" can also be a vector representation or any other suitable computer-processable representation of a profile line or a profile surface of the underbody of the motor vehicle. The underbody profile of the motor vehicle may be known in advance and may be stored, for example, in a control device of the motor vehicle.

A minimum ground clearance is intended to mean, in particular, the smallest ground clearance along the entire underbody profile.

According to one embodiment, in step c) at least three different pairs are selected, wherein at least one ultrasonic transceiver of the at least three different pairs is not arranged along a straight line with all the other of the plurality of ultrasonic transceivers of the at least three different pairs on the underbody of the motor vehicle.

Accordingly, it is advantageously possible to determine not only a profile line, but a profile surface of the ground.

According to a further embodiment, in step d), for each echo signal, on the basis of a signal time of flight between the sending of the associated transmission signal and the reception of the echo signal, and on the basis of installation positions of the first and second ultrasonic transceivers with which the transmission signal was sent and the echo signal was received, an ellipse or an ellipsoid is determined with possible reflection points at which the transmission signal may have been reflected; and the profile of the ground is determined by fitting a surface to the determined ellipses or ellipsoids.

Accordingly, a particularly good approximation of the ground profile to the actual course of the ground can advantageously be achieved.

An "ellipse" or an "ellipsoid" in the present case is intended to mean in particular a number of parameters which uniquely describe the ellipse or ellipsoid. An example of such parameters are: coordinates of the, in particular previously known, installation position of the first ultrasonic transceiver, coordinates of the, in particular previously known, installation position of the second ultrasonic transceiver, and a distance that the signal has traveled, the distance being determined on the basis of the signal time of flight and the sound velocity.

The ellipse or the ellipsoid with potential reflection points at which the transmission signal may have been reflected is in this case in particular an ellipse or ellipsoid, the focal points of which are the installation positions of the first and second ultrasonic transceiver, wherein for each point of the ellipsoid, the sum of a distance of the point from the first focal point and a distance of the point from the second focal point is equal to the above-mentioned distance that the signal has traveled.

The surface which is fitted to the determined ellipses or ellipsoids may in particular be a tangential surface to the determined ellipses or ellipsoids. In particular, the tangential surface can be fitted to the determined ellipses or ellipsoids from below, relative to the motor vehicle.

Alternatively, the surface may be a surface containing all the lowest points of all intersection lines at which any two of the determined ellipses or ellipsoid intersect.

A suitable analytical or numerical method can be used as a fitting method.

According to a further embodiment, in step d), a temporal and/or spatial averaging of the determined ellipses or ellipsoids is also performed.

Accordingly, effects caused by wind or headwind beneath the underbody can be advantageously averaged out.

A temporal averaging, for example, should be understood to mean that measurements with the same pair of first and second ultrasonic transceivers are repeated at a short time interval and an average is formed of the measured signal times of flight or distances traveled, on the basis of which, for example, an ellipse or an ellipsoid with potential reflection points is determined.

A spatial averaging should be understood to mean, for example, that from spatially adjacent ellipses or ellipsoids, mean focal points and a mean distance traveled are determined and from these an averaged ellipse or an averaged ellipsoid is determined.

According to a further embodiment, the method also comprises step f): triggering a procedure affecting the operation of the motor vehicle in accordance with the determined minimum ground clearance.

Accordingly, the operation of the motor vehicle can be advantageously influenced in a suitable manner in order to effectively prevent damage to the motor vehicle due to insufficient ground clearance.

According to a further embodiment, step f) comprises one or more of the following steps: issuing a warning to a driver of the motor vehicle when the minimum ground clearance falls below a threshold value, and/or displaying the determined minimum ground clearance by means of a display device, and/or displaying a graphical representation of the determined profile of the ground surface beneath the motor vehicle by means of a display device and/or initiating an automatic braking and/or stopping of the motor vehicle if the minimum ground clearance (9) falls below a threshold value, and/or raising the vehicle by means of a height-adjustable chassis if the minimum ground clearance falls below a threshold value.

Accordingly, the driver or an automatic device can brake and/or stop the motor vehicle if a ground height approaches the underbody of the motor vehicle by more than the threshold value. Accordingly, damage to the motor vehicle can be advantageously prevented, in particular when driving off-road.

According to a further embodiment, the threshold value is chosen depending on a driving speed of the motor vehicle.

Accordingly, a higher threshold value can advantageously be chosen when the motor vehicle is driving at high speed, since a faster change in the ground height is to be expected when driving faster and a braking distance is extended, and when the vehicle is traveling slowly, a lower threshold value can be chosen to also allow a cautious approach to difficult ground situations when driving sufficiently slowly.

The driving speed of the motor vehicle can be obtained from a speedometer device or the like.

According to another embodiment, the method is carried out while the motor vehicle is traveling.

It is advantageously also possible to carry out the proposed ground clearance monitoring while the motor vehicle is moving, since the proposed method advantageously requires no calibration, no comparison with reference measurements or the like.

According to a further embodiment, in step d) the determined profile of the ground is extrapolated in a direction of travel of the motor vehicle, and in step e) the extrapolated profile is compared with an underbody profile of the motor vehicle extrapolated in the driving direction of the motor vehicle, to determine an extrapolated minimum ground clearance as the minimum ground clearance.

Accordingly, too low a ground clearance can be more advantageously anticipated before the motor vehicle has reached the road section with the excessively low ground clearance, and damage to the motor vehicle can be even more reliably prevented.

The extrapolation can be carried out, for example, by determining a mean gradient in the direction of travel and extending the profile in question according to the determined gradient.

The direction of travel can be determined, for example, by a longitudinal direction or front-to-rear direction of the motor vehicle. Preferably, a steering wheel position or a position of steerable wheels of the motor vehicle and/or a driving speed can also enter into the determination of the direction of travel.

According to a further embodiment, the repetition in step c) is carried out in such a way that in step a) a first ultrasonic transceiver is selected and step b) is carried out simultaneously with a plurality of different second ultrasonic transceivers.

In this way, measurements with a plurality of pairs of ultrasonic transceivers, namely all those pairs which contain the selected first ultrasonic transceiver, can advantageously be carried out simultaneously, and thus more measurements can advantageously be carried out in a shorter time.

According to a further embodiment, the repetition in step c) is carried out in such a way that multiple steps a) are carried out simultaneously with a plurality of different first ultrasonic transceivers, which are activated in such a way that each of the first ultrasonic transceivers sends a transmission signal with a different transmission signature, and in step b) a reception signal waveform of the second ultrasonic transceiver is demodulated to obtain a respective reception signal for each pair consisting of one of the first ultrasonic transceivers and the second ultrasonic transceiver.

In this way, measurements with a plurality of pairs of ultrasonic transceivers, namely all those pairs which contain the selected second ultrasonic transceiver, can advantageously be carried out simultaneously, and thus more measurements can advantageously be carried out in a shorter time.

A "transmission signature" is intended to mean a characteristic of a transmission signal that allows a distinction to be made between transmission signals. For example, different transmission signatures can be obtained by different transmission frequencies, frequency modulations, or amplitude modulations.

A "reception signal waveform" is intended to mean in particular an entire received signal waveform during a time window, starting with the activation of the respective second ultrasonic transceiver for the reception and continuing until the end of the activation for the reception. The time window can have a temporal length which is selected according to the distance between the first and second ultrasonic transceivers and an expected range of ground clearances.

Such a reception signal waveform can be divided by demodulation into a plurality of individual reception signal waveforms, one for each of the transmission frequencies. The position (the time of arrival) of an echo signal can then be identified in the individual reception signal waveforms.

It should be noted that the present and the previously mentioned embodiment can be particularly advantageously combined and signals can therefore be transmitted and received simultaneously with all ultrasonic transceivers. In particular, in this case, a respective ultrasonic transceiver which has been selected as a first ultrasonic transceiver and has emitted a transmission signal, can be switched to a reception mode immediately after the transmission signal has been emitted and can then be selected as a second ultrasonic transceiver, which receives the transmitted signals from the remaining ultrasonic transceivers as reflected reception signals. Accordingly, a maximum number of measurements can advantageously be carried out in the shortest time.

According to a further embodiment, in step b), in a reception signal waveform of the second ultrasonic transceiver, an echo signal which is the first to be received after the time of sending the transmission signal is identified as the received echo signal which corresponds to the transmission signal sent in step a).

Accordingly, echo signals caused by multiple reflections that would distort the measurement result can advantageously be ignored, and the echo signals that are caused by a single reflection can be taken into account.

This means that the respective reception signal waveform can comprise in particular multiple echo signals. In particular, it is conceivable for the transmission signal to be reflected along more than one path to the second ultrasonic transceiver with different signal times of flight and, consequently, the reception signal waveform comprises more than one echo signal at different times. The different signal times of flight can be caused in particular by multiple reflections. A multiple reflection occurs, for example, when a transmission signal is reflected first on the ground, then on the underbody of the motor vehicle, and then reflected on the ground again before it reaches the second ultrasonic transceiver as an echo signal.

According to a further aspect, a computer program product is proposed comprising commands, which, during their execution by a computer device communicatively connected to the plurality of ultrasonic transceivers, cause the computer device to carry out the method as proposed above.

The computer device may, for example, be an electronic control unit (ECU) of the motor vehicle.

According to a further aspect, a device for monitoring a ground clearance beneath a motor vehicle is proposed. A plurality of ultrasonic transceivers spaced apart from one another are arranged on the underbody of the motor vehicle. The device is communicatively connected to the plurality of ultrasonic transceivers and is configured to carry out the proposed method.

"Communicatively connected" is intended to mean any type of connection that enables the transmission of activation signals and response signals in response to the activation signals, for example, a wired connection, a wireless connection, and the like.

Furthermore, a motor vehicle is proposed, on the underbody of which a plurality of ultrasonic transceivers are arranged spaced apart from one another, and which comprises a device as proposed above.

The features, advantages and embodiments described for the proposed method also apply mutatis mutandis to the proposed motor vehicle, the proposed device and the proposed computer program product.

Further possible implementations of the invention also comprise not explicitly mentioned combinations of features or embodiments described above or below with regard to the exemplary embodiments. A person skilled in the art will in this case also add individual aspects as improvements or additions to the respective basic form of the invention.

Further advantageous configurations and aspects of the invention are the subject of the dependent claims and of the exemplary embodiments of the invention that are described below. The invention is explained in more detail below on the basis of preferred exemplary embodiments with reference to the accompanying figures.

Identical or functionally identical elements have been provided with the same reference signs in the figures, unless stated otherwise.

Figure 1:
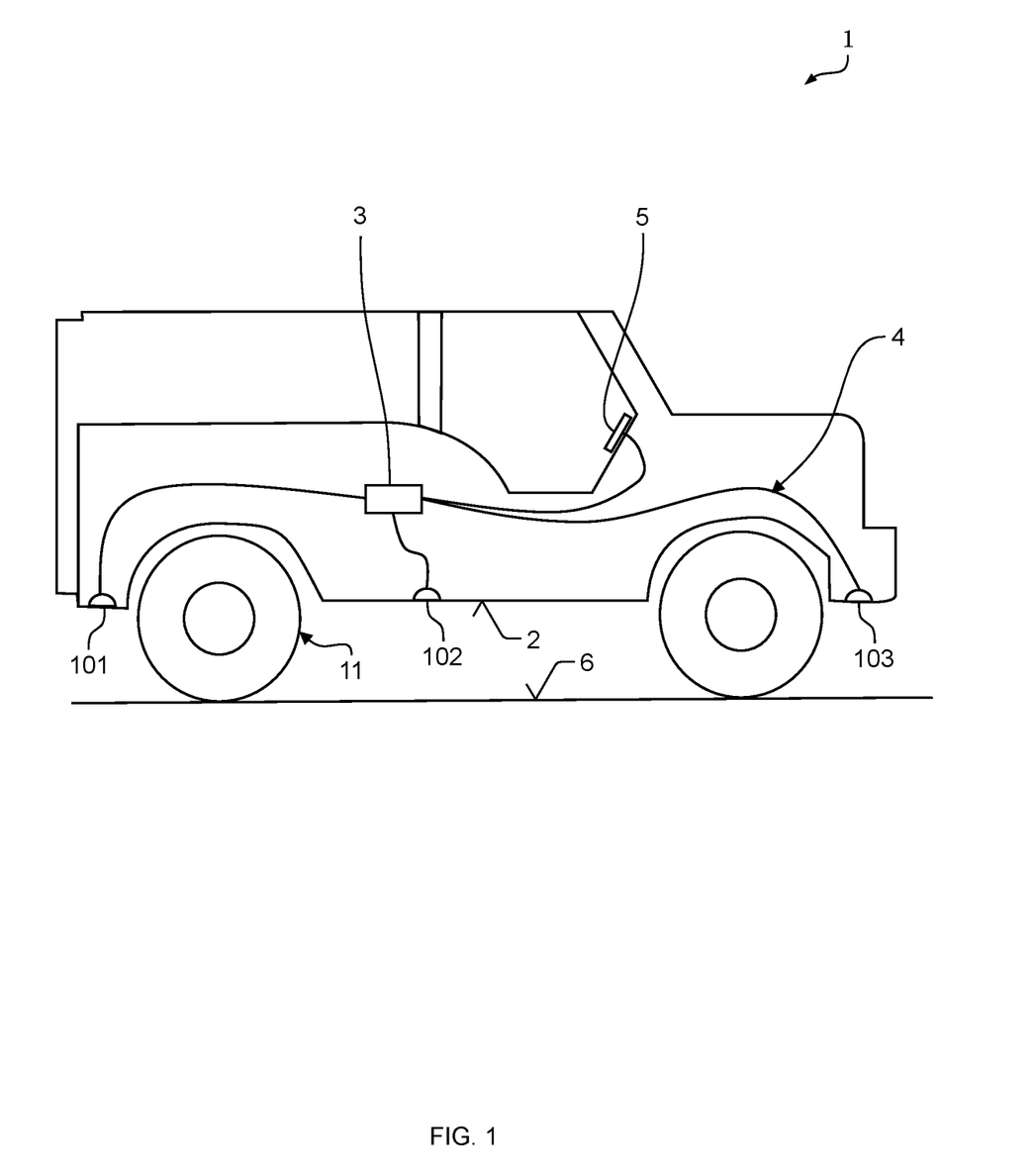
FIG. 1 shows a schematic illustration of a motor vehicle in accordance with an exemplary embodiment.

FIG. 1 shows a schematic illustration of a motor vehicle 1 in accordance with an exemplary embodiment in a side view. In the exemplary embodiments described below, the motor vehicle 1 is an all-terrain vehicle or off-road vehicle. However, there is no restriction in this respect. It should also be noted that in a case where the proposed method is carried out while the off-road vehicle 1 is driving, a direction of travel F of the off-road vehicle 1 in FIGS. 1 to 4 is a direction towards the right in the respective figure.

The off-road vehicle 1 has a plurality of ultrasonic transceivers 101, 102, 103 arranged spaced apart from one another on an underbody 2. The ultrasonic transceivers are preferably arranged and aligned in such a way that each of the ultrasonic transceivers 101, 102, 103 can emit a signal cone, which, when reflected at a ground (not shown in FIG. 1) beneath the off-road vehicle 1, reflects a component of the signal cone in the direction of one or more and, particularly preferably, all other of the ultrasonic transceivers 101, 102, 103.

Preferably, the ultrasonic transceivers 101, 102, 103 can be facing one another. That is, a signal cone emitted by the ultrasonic transceiver 101 can extend diagonally downwards to the right (with reference to FIG. 1, i.e. diagonally in the direction of travel and downwards). A signal cone emitted by the ultrasonic transceiver 102 may have a component that extends diagonally downwards to the left, and another component that extends diagonally downwards to the right. A signal cone emitted by the ultrasonic transceiver 103 can extend diagonally downwards to the left. However, all emitted signal cones can have both a component extending diagonally downwards to the right and a component extending diagonally downwards to the left.

The off-road vehicle 1 also has a control device (ECU) 3, which is communicatively connected to the plurality of ultrasonic transceivers 101, 102, 103, preferably via conductor connections 4 of a cable harness of the off-road vehicle 1.

The control device 3 is configured to carry out the method described below for monitoring a ground clearance, by communicating with the plurality of ultrasonic transceivers 101, 102, 103 and activating them to transmit and receive ultrasonic signals. For this purpose, the control device 3 may comprise a hard-wired circuit, or it may be programmable and embody a computer program product with instructions that cause the control device 3 to carry out the proposed method. The computer program product may be stored in an erasable rewritable read-only memory (EEPROM) of the control device or the computer program product may be loaded from the control device when the off-road vehicle 1 or the like is started via an in-vehicle network from a permanent storage device of the off-road vehicle 1 and/or loaded from a wide-area network such as the Internet.

The off-road vehicle 1 further comprises a display device 5, such as an instrument or a display in a dashboard or the like. The display device 5 is also communicatively connected to the control device 3.

Figure 2:
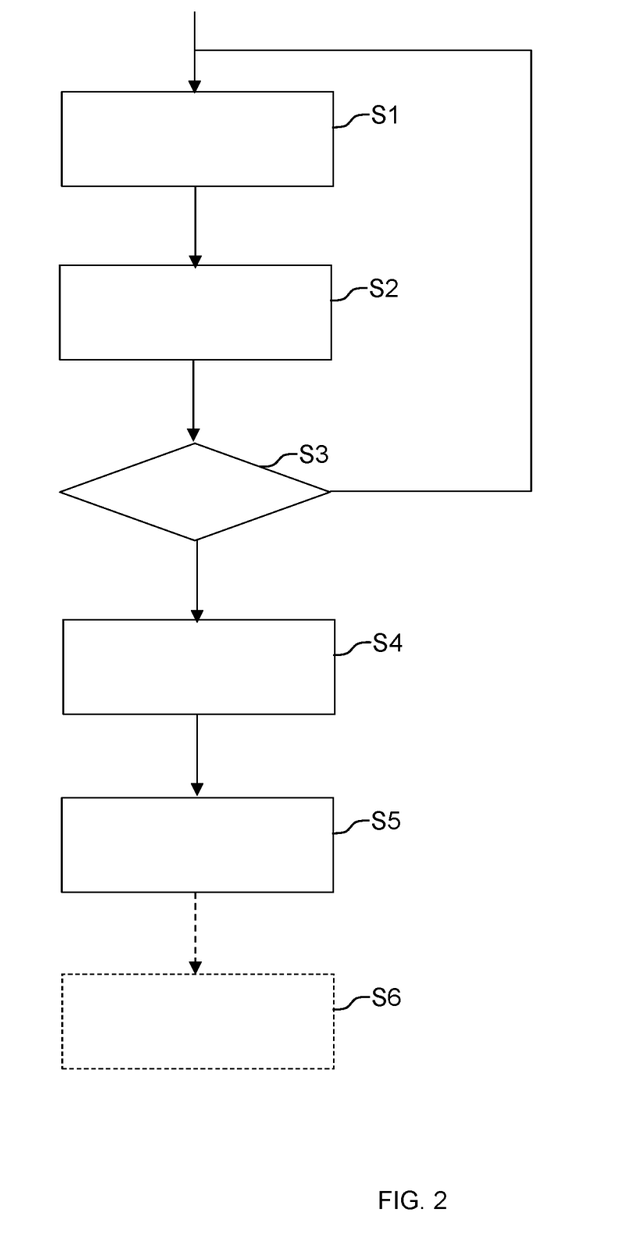
FIG. 2 shows a flow diagram illustrating a method in accordance with an exemplary embodiment.
Figure 3:
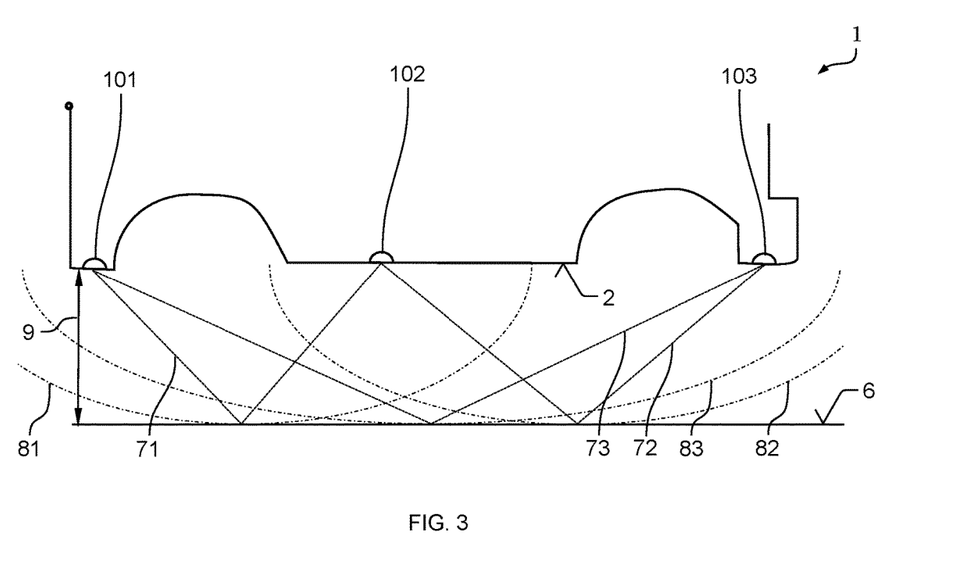
FIG. 3 shows a schematic drawing illustrating the method in accordance with an exemplary embodiment with even ground beneath the motor vehicle.

A method for monitoring a ground clearance beneath a motor vehicle according to a first exemplary embodiment is described below with the aid of FIGS. 1 to 4. In these, FIG. 2 shows a flowchart illustrating the method in accordance with the exemplary embodiment; FIG. 3 shows a schematic representation of a lower section of a bodywork of the off-road vehicle 1 for illustrating the method with even ground 6 beneath the off-road vehicle 1, and FIG. 4 shows a schematic representation for illustrating the method in accordance with an exemplary embodiment with uneven ground 6 beneath the off-road vehicle 1.

Figure 4:
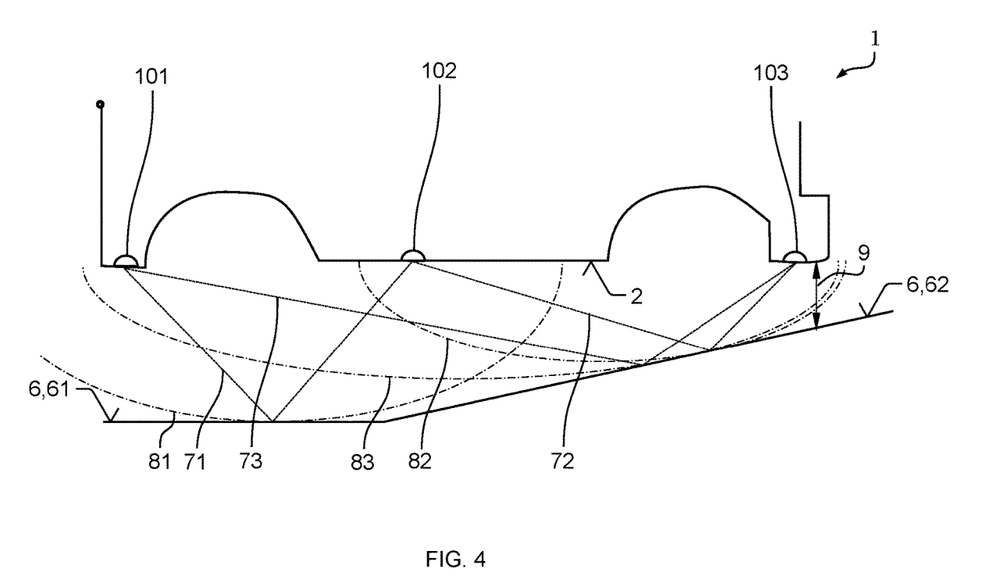
FIG. 4 shows a schematic drawing illustrating the method in accordance with an exemplary embodiment with uneven ground beneath the motor vehicle.

It should be noted that a distance between the underbody 2 of the bodywork of the off-road vehicle 1 and the ground 6 beneath the off-road vehicle 1 in FIG. 3 and FIG. 4 is not shown true to scale but exaggerated in size, to better illustrate the proposed method.

In step S1, the ultrasonic transceiver 101 is selected as a first ultrasonic transceiver and activated in such a way that the ultrasonic transceiver 101 emits a transmission signal generally downwards with respect to the motor vehicle 1. The transmission signal preferably has a wide cone, at least one component of which extends diagonally downwards to the right in FIG. 3. In FIG. 3, with dashed lines, only the propagation path 71 of that component of the cone of the transmission signal of the first ultrasonic transceiver 101 is shown which reaches the ultrasonic transceiver 102.

In step S2, which is preferably carried out simultaneously with step S2, or alternatively, sufficiently before the transmission signal transmitted in step S1 can reach the ultrasonic transceiver 102, the ultrasonic transceiver 102 is selected as a second ultrasonic transceiver and activated in such a manner that the ultrasonic transceiver 102 receives the transmission signal (the component of the cone of the transmission signal), which has propagated along the propagation path 71 and been reflected at the ground 6 beneath the off-road vehicle 1, as a reception signal.

From the beginning of the activation for receiving until the end of the activation for receiving, the ultrasonic transceiver 102 delivers a reception signal waveform which can be evaluated by the control device 3. At the time of carrying out step S2, such an evaluation can either take place immediately, or else the reception signal waveform can be recorded and evaluated later during step S4. The reception signal waveform may, for example, be a waveform of a voltage signal which is delivered by a piezoelectric element or the like of the ultrasonic transceiver 102 mounted on an ultrasonic diaphragm, or the reception signal waveform may be a waveform of a digital signal which is delivered by an electronic component of the ultrasonic transceiver 102 and is indicative of the voltage signal of the piezoelectric element.

In the evaluation, a section of the reception signal waveform can preferably be identified, which is indicative of the reception signal (received ultrasonic signal), for example, a peak within the reception signal waveform. The section of the reception signal waveform thus identified, which indicates the ultrasonic reception signal, can also be referred to in this case as "the reception signal" for the sake of simplicity.

If multiple peaks are contained within the reception signal waveform, according to an advantageous refinement, for example, the temporally first peak can be identified as the reception signal. Preferably, a criterion for the shape and/or height of the peak can also be applied and the temporally first can be identified as the reception signal that meets the specified criterion. In this way, peaks resulting from multiple reflections (ground 6-underbody 2-ground 6) can advantageously be ignored, thus preventing multiple reflections from distorting the measurement result.

Instead of recording the entire reception signal waveform, for example, the reception signal waveform can also be evaluated instantaneously or live/online, and a parameter can be recorded which describes the reception signal, for example, a time at which the peak occurs in the reception signal waveform, which indicates the reception of the reception signal.

The described single execution of step S1 and step S2 with a pair of ultrasonic transceivers 101, 102 can also be interpreted as a measurement which is carried out with the pair of ultrasonic transceivers 101, 102 and in which a measurement point (in the present case, the reception signal or information about the reception signal, such as the time of the peak occurrence) is obtained.

Then, step S3 causes steps S1 and S2 to be carried out with one or more or preferably all possible different permutations of pairs from the ultrasonic transceivers 101, 102, 103, and thus further measurement points to be obtained.

In step S4, a profile of the ground 6 is determined from the measurement points, i.e. based on the received echo signals. A preferred method for implementing step S4 will now be described.

A first measurement point comprises, in particular, data on a time of arrival of the transmission signal emitted by the ultrasonic transceiver 101, which passes along the propagation path 71, is reflected at the ground 6 and received by the ultrasonic transceiver 102. Based on a signal time of flight between sending the transmission signal and receiving the echo signal, multiplied by the sound velocity in air, a path length which the ultrasonic signal has traveled from the ultrasonic transceiver 101 along the propagation path 71 to the ultrasonic transceiver 102 is calculated. Based on the path length, an ellipse 81 is determined, which contains all possible reflection points at which the transmission signal could in principle have been reflected in order to propagate along a path of the calculated path length from the ultrasonic transceiver 101 to the ultrasonic transceiver 102. The ellipse 81 is in particular an ellipse, at the focal points of which the installation positions of the first ultrasonic transceiver 101 and the second ultrasonic transceiver 102 are located, and which describes the set of all points for which the sum of a distance from the first focal point and a distance from the second focal point is equal to the path length along the propagation path 71, determined as described above.

In the same way, the path length of a second propagation path 72 of a transmission signal emitted by the ultrasonic sound transceiver 102, the reflection of which reaches the ultrasonic transceiver 103, and the path length of a third propagation path 73 of a transmission signal transmitted by the ultrasonic transceiver 101, the reflection of which also reaches the ultrasonic transceiver 103, are used to determine further ellipses 82 and 83, on which the respective possible reflection points are located.

It should be stressed again that the actual propagation paths 71, 72, 73 of the transmission signals of the control unit (3 in FIG. 1), which carries out the method, are unknown at this time. Only the ellipses 81, 82 and 83 are defined at this time.

FIG. 3 shows that with a flat ground 6, the flat ground 6 forms a tangential line from below to the ellipses 81, 82, 83.

In FIG. 4, a case is shown for comparison, in which the ground 6 represents a flat section 61 and an inclined section 62. The propagation path 71 and the associated ellipse 81 determined in the region of the flat ground section 61 are the same as in FIG. 3. In contrast, the propagation paths 72 and 73 and the ellipses 82, 83 determined from the corresponding transmission signals in the region of the inclined ground section 62 have changed.

Also in the case shown in FIG. 4, the ground with the flat section 61 and the inclined section 62 forms a tangential line from below to the ellipses 81, 82 and 83.

Accordingly, in step S4, a profile of the ground 6 (a path of the ground 6 reconstructed from the measurements) is determined using the ellipses 81, 82 and 83. Preferably, a tangential line from below can be fitted to the ellipses 81, 82 and 83. Alternatively, it is also possible to place (fit) a profile line through the lower (located lower than the underbody 2 of the off-road vehicle 1) intersection points of the ellipses 81, 82 and 83. The latter method is less accurate, but is also usable for the purpose of determining the ground clearance and can be performed algorithmically, possibly with less computational effort. The respective profile line can be fitted by a suitable analytical or numerical method.

In step S5, a minimum ground clearance 9 beneath the motor vehicle 1 is then determined by comparing the profile of the ground 6 determined in step S4 with the previously known underbody profile of the underbody 2 of the off-road vehicle 1. The minimum ground clearance 9 is then the smallest distance between the profile of the underbody 2 and the profile of the ground 6 along the course of the underbody 2 of the off-road vehicle 1.

In this way, the minimum ground clearance 9 can advantageously be determined even when a motor vehicle 1 is moving, since the measurement does not require any calibration or comparison with a previous reference measurement. The known minimum ground clearance 9 can be used to avoid damage to the off-road vehicle 1 in difficult terrain.

It should be noted that in the present exemplary embodiment with reference to FIGS. 3 and 4, for the sake of ease of comprehension a two-dimensional case is described in which the possible reflection points are located on ellipses 81-83, all of which are arranged in a sectional plane of the off-road vehicle 1. The ultrasonic transceivers 101-103 are also all arranged in the same sectional plane of the off-road vehicle 1. For example, the sectional plane with the ultrasonic transceivers 101-103 may be arranged in a vehicle transverse direction perpendicular to the direction of travel of the vehicle, preferably centrally or substantially centrally between the wheels 11 of the off-road vehicle 1. Thus, a profile line of the ground 6 beneath the off-road vehicle 1 can be detected at a position centrally between the wheels and a minimum ground clearance can be determined there, where a probability that obstacles on the ground 6 protrude into the vicinity of the underbody 2 of the motor vehicle 1 is greatest.

According to a refinement, in step S6 the control unit 3 can initiate a procedure affecting the operation of the off-road vehicle 1 depending on the minimum ground clearance 9. In particular, if the minimum ground clearance 9 falls below a threshold value selected based on safety considerations, the control unit 3 can issue a warning to the driver of the off-road vehicle 1 by means of the display device 5 or a loudspeaker (not illustrated) or the like and/or initiate an automatic braking and/or stopping of the off-road vehicle 1. Accordingly, damage to the off-road vehicle 1 further along the road can be averted. The threshold value can be selected as a fixed value or be dependent on a driving speed of the off-road vehicle 1, which the control unit 3 can obtain for example from a tachometer device, not shown, in particular chosen higher at higher driving speeds than at lower driving speeds. Alternatively, or in addition to this, for example, on the display device 5, depending on or independently of the threshold value being undershot, the determined profile of the ground 6 can be graphically visualized and thus support the driver at all times when driving on difficult terrain. If a height-adjustable chassis is fitted, the vehicle can be raised using the height-adjustable chassis if the minimum ground clearance (9) falls below a threshold value According to a further refinement, the determined profile of the ground 6 can be extrapolated in the direction of travel (rightwards in FIGS. 3 and 4), for example by means of a gradient in a forward section of the profile of the ground 6 in the direction of travel. The profile of the underbody 2 can also be extrapolated in the direction of travel. The minimum ground clearance can then be determined as the smallest distance between the extrapolated profile of the ground 6 and the extrapolated profile of the underbody 2. Thus, obstacles on the ground 6 ahead of the vehicle in the direction of travel F can advantageously also be anticipated.

Figure 5:
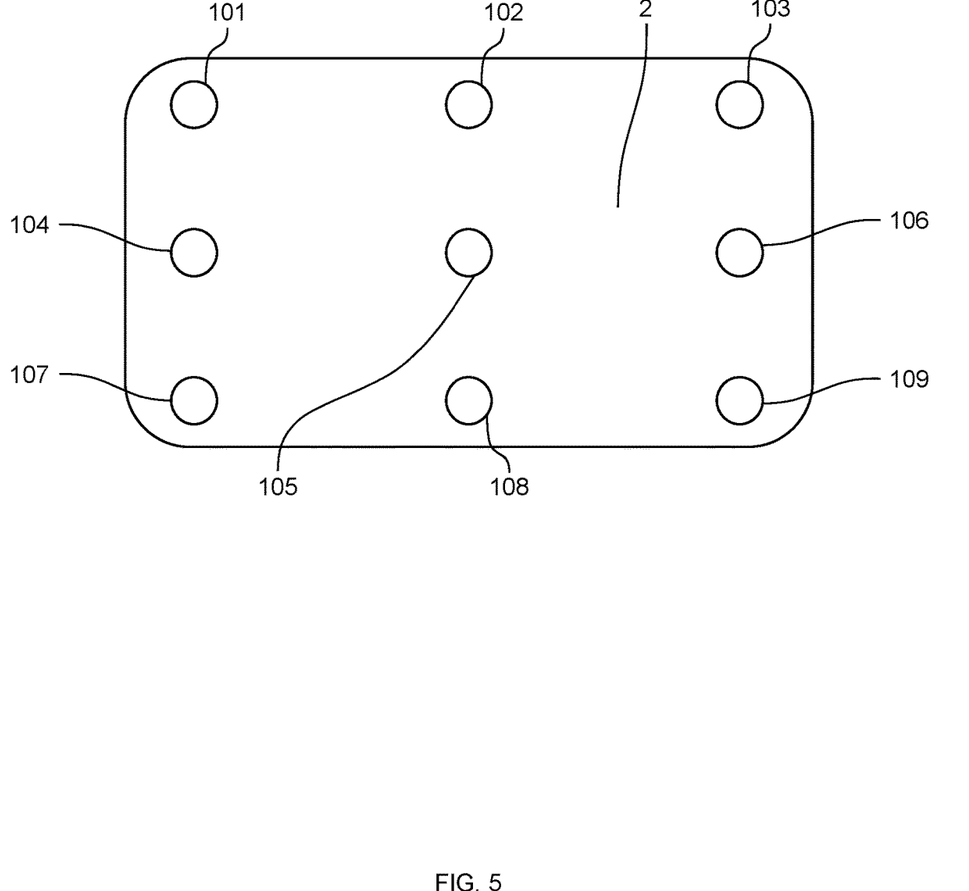
FIG. 5 shows a schematic view of an underbody of a motor vehicle in accordance with an exemplary embodiment.

FIG. 5 shows a schematic view of an underbody 2 of an off-road vehicle 1 in accordance with a second exemplary embodiment. Reference is made to FIG. 1, FIG. 2, and FIG. 5.

According to the second exemplary embodiment, nine ultrasonic transceivers 101-109 are arranged on the underbody 2 in a two-dimensional grid, which essentially covers the entire underbody 2 of the off-road vehicle 1. In other words, in the arrangement shown in FIG. 5 at least three different pairs consisting of a first, transmitting and a second, receiving ultrasonic transceiver 101-109 can be formed in such a way that at least one ultrasonic transceiver 101-109 of the at least three different pairs is not arranged along a straight line with all the other of the plurality of ultrasonic transceivers 101-109 of the at least three different pairs.

The method for determining the ground clearance beneath the off-road vehicle 1 can be carried out with the two-dimensional array of the ultrasonic transceivers 101-109 shown in FIG. 5 in the same manner as the method for determining the ground clearance beneath the off-road vehicle 1, which has been described for the first exemplary embodiment. In particular, in steps S1 to S3 preferably all possible permutations of different pairs of a first and a second ultrasonic transceiver 101-109 are formed and a measurement is carried out for each of these pairs. It should be noted that since nine ultrasonic transceivers 101-109 are arranged in the second exemplary embodiment, the number of these pairs is seventy-two, in other words, seventy-two different measurement points are available.

In contrast to the first exemplary embodiment, however, in step S4 instead of the ellipses (71-73 in FIGS. 3 and 4), on which possible reflection points of the transmission signals are arranged, in the second exemplary embodiment, three-dimensional ellipsoids with possible reflection points are determined. The profile of the ground 6 is determined in step S5 by fitting a tangential surface from below to the determined ellipsoids or by fitting a cross-sectional surface through the lowest intersection points of the ellipsoids.

In this way, according to the second exemplary embodiment, it is advantageously possible to obtain a profile of the ground 6 beneath the off-road vehicle 1 not only as a profile line in a two-dimensional plane of intersection through the off-road vehicle 1, but as a profile surface, which can preferably cover the entire region between the wheels 11 of the motor vehicle 1 or the entire region beneath the off-road vehicle 1.

The other advantages and features of the first exemplary embodiment also apply mutatis mutandis to the second exemplary embodiment.

According to a third exemplary embodiment, the same ultrasonic transceiver arrangement is used as in the second exemplary embodiment, which is shown in FIG. 5. However, in this case measurements are only made using pairs arranged along the horizontal lines 101-102-103, 104-105-106 and 107-108-109, along the vertical lines 101-104-107, 102-105-108 and 103-106-109 and along the diagonal lines

101-105-109 and 103-105-107. Along each of the lines, measurements in steps S1 to S3 are initially made in the same manner as shown in the first exemplary embodiment. For example, along the line 101-102-103, the ultrasonic transceivers 101 and 102, 101 and 103, and 102 and 103 are selected successively or simultaneously as pairs for a given measurement. Along the line 103-105-107, the ultrasonic transceivers 103 and 105, 105 and 107, and 103 and 107 are selected as pairs. Corresponding pair selections are made along the remaining lines. In step S4, ellipses with possible reflection points are then determined. Thus, the determined ellipses lie in vertical planes of intersection through the off-road vehicle 1 along the horizontal lines 101-102-103, and 104-105-106 and 107-108-109, along the vertical lines 101-104-107, 102-105-108 and 103-106-109, and along the diagonal lines 101-105-109 and 103-105-107. Three ellipses are determined along each line in step S4, resulting in a total of 24 ellipses. Then, in step S4, a profile surface is fitted to the determined ellipses from below to determine the profile of the ground 6.

According to the third exemplary embodiment, the amount of data to be processed is smaller and the calculation steps can be simplified, which means less computing power may be required. Nevertheless, a satisfactory accuracy in the determination of minimum ground clearance can be achieved.

The other advantages and features of the first and second exemplary embodiment also apply mutatis mutandis to the third exemplary embodiment.

Although the present invention has been described on the basis of exemplary embodiments, it may be modified in diverse ways.

In particular, it should be noted that the described extrapolation of the particular profile of the ground 6 in the direction of travel of the off-road vehicle 1 is not necessary even in the case of a moving off-road vehicle 1 in order to achieve the advantages of the proposed solution. If, for example, a part projecting downwards from the underbody 2, such as an oil pan or the like, is arranged in a rear section of the off-road vehicle 1 in the direction of travel F, it is sufficient if a ground clearance below the minimum permissible level is detected in a front section of the off-road vehicle 1 while the off-road vehicle 1 is moving and the driver is warned or the off-road vehicle is braked or stopped, in order to prevent the oil pan in the rear section of the off-road vehicle 1 being damaged as the off-road vehicle 1 continues moving by the ground elevation detected by the ground clearance falling below the minimum permissible level in the front section of the off-road vehicle 1. In this case, a threshold value for triggering the procedure affecting the operation of the motor vehicle 1 may be specified by taking account of the dimensions of the oil pan or similar part.

The ellipses 81-83 or ellipsoids determined according to the exemplary embodiments can be temporally and/or spatially averaged before the tangential line or the tangential profile is fitted to the averaged ellipses or ellipsoids in order to smooth out measurement deviations due to headwind and the like.

For ease of comprehension, it has been described that steps S1 through S3 are executed consecutively for the different pairs of ultrasonic transceivers 101-109. However, it is conceivable that in step S1, one ultrasonic transceiver 101-109 is selected as the first ultrasonic transceiver 101-109 and sends a transmission signal, and that a plurality and preferably all of the rest of the ultrasonic transceivers 101-109 are selected as a respective second ultrasonic transceiver 101-109 and the steps S2 are carried out in parallel or simultaneously for each of the second ultrasonic transceivers 101-109. It is also conceivable that a plurality and preferably all of the ultrasonic transceivers 101-109 are selected as first ultrasonic transceivers 101-109 and that each of the first ultrasonic transceivers 101-109 sends a transmission signal with a different transmission signature. In this case, in step 2, for the or for each of the selected second ultrasonic transceivers 101-109 a demodulation of the reception signal waveform can be performed to determine a plurality of reception signals, one for each of the first ultrasonic transceivers 101-109. In this way, all measurement points can advantageously be determined simultaneously within the shortest time. The method is therefore particularly well suited for use in a moving off-road vehicle 1.

The method has been described using the example of an off-road vehicle 1, but is also suitable for any other type of vehicles, such as passenger cars, military vehicles, amphibious vehicles and the like and offers corresponding advantages in these cases.

LIST OF REFERENCE SIGNS

1 motor vehicle, off-road vehicle
2 underbody
3 control device
4 line connections
5 display device
6 ground
9 minimum ground clearance
11 wheel
61 flat section of the ground
62 inclined section of the ground
71-73 propagation paths
81-83 ellipses (ellipsoids) with potential reflection points
101-109 ultrasonic transceivers (ultrasonic transceivers)

The invention claimed is:

1. A method for monitoring a ground clearance beneath a motor vehicle, wherein, on the underbody of the motor vehicle a plurality of ultrasonic transceivers are arranged spaced apart from one another, the method comprising:
    selecting a first ultrasonic transceiver from among the plurality of ultrasonic transceivers and activating the first ultrasonic transceiver to send a transmission signal;
    selecting a second ultrasonic transceiver from among the plurality of ultrasonic transceivers and activating the second ultrasonic transceiver to receive a reception signal which is a reflection of the transmission signal;
    repeating selecting a first ultrasonic transceiver, sending a transmission signal, selecting a second ultrasonic receiver, and receiving a reflected signal,
        wherein different pairs consisting of a first and a second ultrasonic transceiver are selected to receive a respective echo signal;
    determining a profile of a ground beneath the motor vehicle on the basis of the received echo signals; and
    determining a minimum ground clearance beneath the motor vehicle by comparing the determined profile of the ground with an underbody profile of the motor vehicle.

2. The method as claimed in claim 1,
    wherein in the process of repeating signal sending and reception at least three different pairs of ultrasonic transceivers are selected,
    wherein at least one ultrasonic transceiver of the at least three different pairs is not arranged along a straight line with all the other of the plurality of ultrasonic transceivers of the at least three different pairs on the underbody of the motor vehicle.

3. The method as claimed in claim 2,
wherein in the process of determining a profile of a ground beneath the motor vehicle, for each echo signal, on the basis of a signal time of flight between the sending of the associated transmission signal and the reception of the echo signal, and
on the basis of installation positions of the first and second ultrasonic transceivers with which the transmission signal was sent and the echo signal was received, an ellipse or an ellipsoid is determined with possible reflection points at which the transmission signal may have been reflected; and the profile of the ground is determined by fitting a profile surface to the determined ellipses or ellipsoids.

4. The method as claimed in claim 3,
wherein in the process of determining a profile of a ground beneath the motor vehicle, a temporal and/or spatial averaging of the determined ellipses or ellipsoids is also carried out.

5. The method as claimed in claim 1, further comprising:
triggering a procedure affecting the operation of the motor vehicle in accordance with the determined minimum ground clearance.

6. The method as claimed in claim 5, wherein triggering a procedure comprises:
issuing a warning to a driver of the motor vehicle when the minimum ground clearance falls below a threshold value,
displaying the determined minimum ground clearance by means of a display device,
displaying a graphical representation of the determined profile of the ground surface beneath the motor vehicle by means of a display device,
initiating an automatic braking and/or stopping of the motor vehicle if the minimum ground clearance falls below a threshold value, and
raising the vehicle using a height-adjustable chassis if the minimum ground clearance falls below a threshold value.

7. The method for monitoring a ground clearance as claimed in claim 6,
wherein the threshold value is chosen depending on the driving speed of the motor vehicle.

8. The method for monitoring a ground clearance as claimed in claim 1, wherein the method is carried out while the motor vehicle is driving.

9. The method as claimed in claim 8,
wherein in the process of determining a profile of a ground beneath the motor vehicle the determined profile of the ground is extrapolated in a direction of travel of the motor vehicle and in the process of determining a minimum ground clearance the extrapolated profile is compared with an underbody profile of the motor vehicle extrapolated in the driving direction of the motor vehicle, to determine an extrapolated minimum ground clearance as the minimum ground clearance.

10. The method for monitoring a ground clearance as claimed in claim 1,
wherein the process of repeating signal sending and reception is carried out in such a way that in the sending of the transmission signal a first ultrasonic transceiver is selected and the process of receiving the reflected signal step is carried out simultaneously with a plurality of different second ultrasonic transceivers.

11. The method as claimed in claim 1,
wherein the repetition of sending and receiving signals in is carried out in such a way that multiple sending steps are carried out simultaneously with a plurality of different first ultrasonic transceivers, which are activated in such a way that each of the first ultrasonic transceivers sends a transmission signal with a different transmission signature, and in the receiving of the reflected signals a reception signal waveform of the second ultrasonic transceiver is demodulated to obtain a respective reception signal for each pair consisting of one of the first ultrasonic transceivers and the second ultrasonic transceiver.

12. The method as claimed in claim 1,
wherein in the receiving of the reflected signals, in a reception signal waveform of the second ultrasonic transceiver, an echo signal which is the first to be received after the time of sending the transmission signal, is identified as the received echo signal which corresponds to the transmission signal sent.

13. A non-transient computer-readable medium comprising program instructions which, during their execution by a computer device communicatively connected to the plurality of ultrasonic transceivers, cause the computer device to carry out the method as claimed in claim 1.

14. A device for monitoring a ground clearance beneath a motor vehicle,
wherein, on the underbody of the vehicle, a plurality of ultrasonic transceivers are arranged spaced apart from one another,
wherein the device is communicatively connected to the plurality of ultrasonic transceivers and is configured to carry out a method as claimed in claim 1.

15. A motor vehicle,
wherein, on the underbody of the vehicle, a plurality of ultrasonic transceivers are arranged spaced apart from one another,
wherein the motor vehicle comprises a device as claimed in claim 14.

* * * * *